United States Patent [19]

Brown et al.

[11] Patent Number: 4,482,673

[45] Date of Patent: Nov. 13, 1984

[54] AQUEOUS COATING COMPOSITION COMPRISING SELF-EMULSIFIABLE ESTER OF EPOXY AND ACID CONTAINING ADDITION POLYMER AND METHOD OF ITS PREPARATION

[75] Inventors: George L. Brown, Scotch Plains; Miksa de Sorgo, Freehold; Arthur T. Spencer, New Providence, all of N.J.

[73] Assignee: SCM Corporation, New York, N.Y.

[21] Appl. No.: 378,314

[22] Filed: May 14, 1982

Related U.S. Application Data

[63] Continuation of Ser. No. 249,784, Apr. 1, 1981, abandoned, which is a continuation of Ser. No. 95,738, Nov. 19, 1979, abandoned, which is a continuation-in-part of Ser. No. 914,471, Jun. 12, 1978, abandoned.

[51] Int. Cl.$^3$ ............................................. C08G 59/00
[52] U.S. Cl. .................................... 525/119; 525/113; 523/406
[58] Field of Search ................ 523/406, 412; 525/119, 525/530, 113

[56] References Cited

U.S. PATENT DOCUMENTS

| | | | |
|---|---|---|---|
| 3,943,187 | 3/1976 | Wu ........................................ | 428/418 |
| 3,945,963 | 9/1976 | Levine et al. ......................... | 523/412 |
| 4,029,620 | 6/1977 | Chen .................................... | 523/409 |
| 4,126,596 | 11/1978 | Schimmel et al. ................... | 428/418 |
| 4,247,439 | 1/1981 | Matthews et al. ................... | 523/412 |

Primary Examiner—Paul Lieberman
Assistant Examiner—Amelia B. Yarbrough
Attorney, Agent, or Firm—Thomas M. Schmitz

[57] ABSTRACT

Non-gelled compositions containing hydroxy ester copolymer having carboxyl groups and substantially free of oxirane groups and the method of making them are disclosed which are the esterification reaction product of (A) acidic addition copolymer; and
(B) epoxy resin including aromatic polyether containing oxirane groups in which the epoxy resin comprises at least 40% of the total resin solids and contains insufficient oxirane groups to react with all of the carboxyl groups in the copolymer; in which esterification is conducted in the presence of higher than the normal amount of amine catalyst, i.e., 1.5% or more. The resulting composition is neutralized with amine, is self-emulsifiable in water and is useful for coatings, e.g., for cans.

1 Claim, No Drawings

AQUEOUS COATING COMPOSITION COMPRISING SELF-EMULSIFIABLE ESTER OF EPOXY AND ACID CONTAINING ADDITION POLYMER AND METHOD OF ITS PREPARATION

CROSS-REFERENCE TO RELATED APPLICATION

This is a continuation of application Ser. No. 249,784 filed Apr. 1, 1981, abandoned, which is a continuation of application Ser. No. 095,738, abandoned, which application is a continuation-in-part of Ser. No. 914,471, filed June 12, 1978, abandoned.

The invention disclosed and claimed in this application is an improvement over the invention disclosed and claimed in the companion application of G. L. Brown and A. T. Spencer filed of even date herewith, entitled "Aqueous Coating Composition Comprising Self-emulsifiable Ester of Epoxy and Acid Containing Addition Polymer".

BRIEF DESCRIPTION OF THE INVENTION

This invention relates to aqueous emulsion compositions having improved stability, and to the method of their preparation. In particular, the compositions of thisinvention are mixture, self-emulsifiable in water, comprising a non-gelled hydroxy ester copolymer containing carboxyl groups and substantially free of oxirane functionality. The hydroxy-ester copolymer is the esterification reaction product of an acidic addition copolymer and at last 40% by weight of an aromatic epoxy resin. The acidic addition copolymer is a solution copolymer of monoethylenically unsaturated monomers comprising at least about 20% of monoethylenically unsaturated carboxylic acid, based on the total weight of monomer. The epoxy resin is an aromatic polyether which contains sufficient oxirane groups to provide a ratio of oxirane groups to carboxyl groups in the acidic copolymer of from 1:2 to 1:20. The esterification reaction of the acidic addition copolymer and the epoxy resin is conducted in the presence of greater than 1.5% by weight of the reactants of an amine esterification catalyst. A sufficient proportion of the carboxy groups in the copolymer-epoxy resin hydroxy ester are reacted with a base to render the composition self-emulisifiable in water. The resulting compositions are useful as coatings, for example, as can coatings which are cured by baking. An aminoplast or phenoplast resin in small proportion may be added to enhance the cure on baking.

DETAILED DESCRIPTION OF THE INVENTION

Epoxy resins contain a plurality of aromatic groups joined together by ether linkages, and provide excellent physical and chemical properties. It has been difficult to employ such resins in aqueous media because they lack storage stability. This is desirable and of particular importance when spray application is contemplated, especially for the interior of sanitary cans. The slightest change in the pH of the aqueous composition as a result of hydrolytic instability results in a marked change in the viscosity and application properties of the coating.

To obtain aqueous coatings of proper resin solids content and viscosity, it has often been necessary in the trade to employ an emulsion system in which a water immiscible component is suspended in an aqueous continuous phase with an emulsifying agent. Such emulsion systems are intrinsically unpredicable since the particle size of the emulsion will vary with the agitation of the composition. This invention provides self-emulsifiable compositions in which the particle size of the emulsion is substantially the same regardless of whether high speed agitation is used or whether the mixture with water is barely stirred.

It has been found that aqueous coating composition having the desirable characteristics associated with epoxy resins are obtained by reacting the epoxy resin with an addition polymer containing free carboxyl groups to form the ester of the epoxy and the addition polymer. However, when a desirably high amount of epoxy comprising 40% by weight or more of the final ester copolymer is used in the esterification reaction with the carboxyl containing copolymer, difficulty with gelling of the composition is encountered. Gelling manifests itself in the formation of an ester copolymer having an undesirably high viscosity which is not usable. It has now been found that gelling can be reduced or eliminated even in copolymers containing epoxy resin in amounts far greater than 40% by weight by introducing amine into the reaction medium in excess of the catalytic amounts of about 0.1 to 0.3% typically used in the prior art for esterification. Although higher amounts of amine catalyst are broadly contemplated in the prior art such larger amounts are rarely used because it has been considered a waste of material. In accordance with this invention, the amine is introduced in an amount of more than 1.5% by weight based on the reactants which amount is also sufficient to avoid gelling with the particular set of reactants involved. Thus, at the same time, the benefits of high epoxy content are obtained and the problems of gelling are avoided.

In the companion application of G. L. Brown and A. T. Spencer certain ester copolymer compositions are disclosed which are prepared by reaction of an addition copolymer containing carboxyl groups and at least 40% of a mixture including epoxy resin and at least 5% by weight of another component which can be defunctionalized epoxy resin. In the related application a 40% aromatic resin content is achieved but only a portion of the resin is epoxy resin, i.e., it contains oxirane groups, and a portion of the aromatic resin is free of oxirane groups, e.g., epoxy resin defunctionalized by reaction with a phenol or an acid. The method of this invention also enables the production of non-gelled esters of epoxy and acid containing addition polymer where the epoxy comprises a mixture containing at least 40% by weight of an aromatic polyether containing oxirane groups, and an aromatic polyether devoid of oxirane groups. The advantage of this invention is that it enables the production of nongelled esters of epoxy and acid copolymer where the propertions are such that gelation would occur if small amounts of amine, i.e., less than 1.5%, were used in the esterification reaction.

A factor of importance in this invention is the employment of epoxy resins having an average molecular weight($M_n$) determined by calculation of at least 1,500. Such high molecular weight aromatic polyethers are imcompatible with carboxyl-functinal addition polymer. Thus, while both materials may be soluble in the same organic solvent, the solutions do not disolve in one another and tend to separate. While lower molecular weight epoxides yield compatible solutions, the higher molecular weight epoxides provide more desirable properties. Substantially complete esterification of the oxirane groups by the carboxyl groups in the copolymer eliminates the incompatibility of the high molecular weight epoxides and, at the same time, gives the benefits of their better properties.

Still another factor of importance in achieving the optimum results is the use of mixtures of monoepoxides and diepoxides. It is desired to chemically couple together with the carboxyl copolymer as much epoxide as possible. Some of this epoxide is desirably a diepoxide in order to increase the molecular weight and complexity of the final copolymer. However, the more monoepoxide, the more total aromatic polyether can be chemically combined with the carboxyl copolymer. The maximum proportion of diepoxide is subject to many variables and the only limit is the avoidance of gelation. This factor will be defined by the term "non-gelled". The high molecular weight and complexity of the copolymers formed herein lowers the proportion of curing agent needed, resulting in tougher and more impact resistant cured coatings.

A further point of considerable importance in achieving optimum results where aromatic polyether devoid of oxirane groups is present, is the selection of bisphenol-terminated aromatic polyethers as the oxirane-free polyether which finds its way into the discontinuous phase of the emulsion. Bisphenol-terminated aromatic polyethers possess excellent hydrolytic stability in aqueous alkaline medium and give the best properties in the final, cured products. Introduction of the oxirane-free polyether can be accomplished in many different ways, including addition of such a component to epoxy resin or by defunctionalization of the epoxy resin with any of a number of defunctionalizing agents. This invention is not limited to any manner of achieving a mixture containing epoxy and aromatic polyether devoid of oxirane groups.

Another point of importance in achieving the optimum results under this invention where oxirane-free polymer is present is the chemical similarity between the oxirane-free hydroxy-functional aromatic polyether, and the aromatic polyether epoxide present in the mixture which is reacted with the acidic copolymer. This chemical similarity is believed to contribute to the achievement of a self-emulsifiable composition. As indicated above, these compositions form stable emulsions with water which have a particle size largely independent of the conditions of agitation or storage.

Other and further features of the invention will become apparent from the following discussion of the various components which are combined herein and the manner of combining them.

One main component of the final copolymer composition is an addition copolymer of monoethylenically unsaturated monomers comprising at least about 20% of monoethylenically carboxylic acid, based on the total weight of monomers. These copolymers are themselves well known, being unusual in this invention solely because of the large amount of copolymerized carboxylic acid. The balance of the copolymer is preferably nonreactive under the contemplated conditions of polymerization, prereaction with the epoxy resin, and cure, but small amount of other reactive monomers, e.g., hydroxy monomers such as 2-hydroxy ethyl methacrylate, amide monomers such as acrylamide, and N-methylol monomers such as N-methylol acrylamide, can be used.

The non-reactive monomers are, for example, acrylate and methacrylate esters, such as ethyl acrylate, methyl methacrylate or isobutyl methacrylate, styrene or vinyl toluene, vinyl acetate, vinyl chloride, vinylidene chloride, acrylonitrile, and the like. Their function is to enhance solvent solubility and film formation.

The carboxyl-functional monomer in large proportion is essential. The preferred minimum propotion is 30% of the weight of the monomer. Methacrylic acid provides the best hydrolytic stability and is very much preferred, but other acids are also useful, such as fumaric acid, acrylic acid, crotonic acid, itaconic acid, and the like. Up to about 80% of the monomers can be carboxyl functional, but the maximum proportion is more generally determined by retention of solvent solubility of the copolymer.

In accordance with this invention the addition copolymer is preformed and reacted with the epoxy resin in the presence of more than 1.5% of amine, based on the reactants.

The addition copolymer must be made in solution so that it is non-gelled and organic solvent-soluble.

Aromatic polyethers, and particularly diglycidyl ethers are well known and available in commerce. The usual aromatic polyether backbone of the epoxy resin is based on a bisphenol which defines a pair of phenolic groups joined together through an intervening divalent hydrocarbon. The preferred bisphenols have the formula:

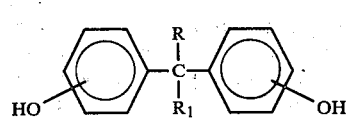

in which R and $R_1$ are hydrogen or alkyl groups containing up to 8 carbon atoms. Bisphenol A is particularly preferred, this compound having the two OH groups in the para position, and R and $R_1$ are each methyl.

The epoxy resins which are used herein possess hydroxy groups in addition to epoxy groups. The higher the molecular weight of the epoxy resin the more hydroxy groups are present. In addition, when the epoxy resin is defunctionalized by reaction with a bisphenol, for example, to reduce the proportion of diepoxide, additional hydroxy groups are provided. These hydroxy groups can participate in the final curing reaction.

Among the common epoxy resins avilable in commerce are diglycidyl ethers made by reaction of epichlorohydrin with Bisphenol A. Typically, they have a molecular weight in the range of about 350 to 6,000.

Mixtures having an average molecular weight of at least about 1,500 and containing less than 50% by weight of diglycidyl ethers are preferred for use in this invention. A simple way of providing such mixture is by reacting a lower molecular weight diglycidyl ether with between 1 and less than 2 molar proportions of a bisphenol. It is essential that the reaction be stopped when the desired degree of defunctionalization is achieved. The reaction may be stopped by lowering temperature or adding the acidic copolymer. This increases molecular weight and provides bisphenol terminal groups. It is especially preferred to use a mixture contaning from 3% to about 30% by weight of diglycidyl ethers. The molecular weight of the epoxy resins is normally obtained by calculation.

It is surprising to be able to combine the higher molecular weight epoxy resins preferred herein with preformed copolymers to provide non-gelled compatible compositions. It is also surprising to obtain water dispersible compositions where the proportion of the mixture contaning epoxy resin is large. In accordance with this invention 75% by weight and higher of epoxy resin can be reacted with the carboxyl containing addition copolymer without gelation.

As indicated above, the method of this invention is applicable where a mixture containing polyethers with oxirane groups and polyethers devoid of oxirane groups is used such as by defunctionalization of the epoxy resin.

Defunctionalization of the epoxy resin can be performed in various ways instead of by reaction with a bisphenol mentioned previously. For example, phenols other than bisphenols, i.e., monofunctional phenols, can be used. In any case, basic-catalysts are normally used in reactions with phenols. Carboxylic acids such as benzoic acid or octanoic acid, can also be used to defunctionalize the epoxy resin, basic catalysts again being appropriate. In addition, alcohols such as octanol, are suitable defuntionalizing agents. The etherification reaction with alcohol is fostered by the presence of a catalyst such as boron trifluoride.

All or part of the component which is free of oxirane groups can be provided by simply adding an appropriate preformed aromatic polyether. That is, the aromatic polyether free of oxirane groups need not be formed in any epoxy defunctionalization reaction as previously described. Similarly, the component containing a simple epoxy group, the presence of which is preferred, can be added as a preformed component.

The esterification reaction involving the oxirane groups of the epoxy resin and carboxyl functionality of the addition copolymer is a conventional reaction which is normally carried out in the presence of a small amount of an amine esterification catalyst. An appropriate amine is dimethylamino ethanol, but many others are known such as dimethyl benzyl amine, ethanolamine, diethanolamine and morpholine. These catalysts are normally used in an amount of from 0.1-0.3% of the materials subjected to esterification but in accordance with this invention the amine is used in amounts greater than 1.5% which is also sufficient to avoid gelation. Up to about 15% by weight of amine esterification catalyst can be used, but it is preferred to employ up to about 10%. The maximum amount of amine catalyst is not critical, but it is desired to avoid the use of unnecessary excess.

The compositions of this invention form films with reasonably good properties on baking in the absence of anyexternal curing agent. However, from 1-25% of the curing agents such as aminoplast resins, phenoplast resins and mixtures thereof will serve to enhance the cure. With analogous prior art polymers at least 15% of curing agent, based on the total weight of polymer is normally required. While such levels of curing agents are useful with the hydroxy ester copolymers of this invention, this invention is unusual in enabling the achievement of a superior cure using a smaller proportion of curing agent. For example, 2-12% is entirely sufficient to cure films containing the hydroxy ester copolymers of this invention. The advantage in using reduced amounts of curing resin is that the smaller proportion of curing agent needed to provide the desired solvent insolubility results in less brittleness in the cured film.

The preferred curing agents are water dispersible. These will be illustrated by hexamethoxy methyl melamine, or by A stage phenol-formaldehyde resols. However, the compositions of this invention are emulsions and water dispersibility of the curing agent is not essential.

The curing of analogous compositions by baking, is entirely conventional in the art. Presumably, the methylol groups introduced by the curing agent react with the hydroxy and carboxyl groups present in the copolymer, and with the hydroxy present in the aromatic polyether devoid of oxirane functionality. Acidic curing agents are commonly employed to facilitate the cure, though this is not essential, especially when a phenoplast curing agent is used.

In the preferred compositions, the epoxy resin is a mixture of bisphenolic polyethers, at least 10% of which contain oxirane functionality, and at least 3% of the total bisphenolic polyethers are diglycidyl ethers. As previously indicated, these bisphenolic polyethers are of relatively high molecular weight, possessing an average molecular weight, determined by calculation, of at least 1,500. The acidic copolymer which is combined with the epoxy resin is a solution copolymer of about 30-70% of methacrylic acid, the balance of the monomers being nonreactive as previously defined, said propotions being based on total resin solids. The epoxy resin constitutes from 55-90% of the total resin solids content, and it provides a ratio of oxirane groups to carboxyl groups of from 1:4 to 1:10. From about 30% to about 90% of the carboxyl functinality in the polymer product is reacted with a volatile amine which may be ammonia, or other volatile amine, such as triethyl amine or, preferably, dimethylamino ethanol.

The carboxyl-functional copolymers which are preferred generally have an average molecular weight ($M_n$) in the range of 3,000 to 20,000, preferably 3,000-6,000. Molecular weight can be controlled by monomer content during polymerization, or catalyst concentration, or polymerization temperature, these being known expedients for this purpose. Mercaptan chain termination is preferably avoided especially where sanitary can use is contemplated, as mercaptans have an offensive odor.

Lastly, in the preferred use of the compositions of this invention from about 3% to about 10% of water dispersible aminoplast resin is added to the mixture to assist in cure on baking.

The resins of this invention are solids and are used by dissolution in a volatile organic solvent. A wide variety of solvents are suitable. In general, any solvent which does not interfere with the achievement of an emulsion when the acidic copolymer salts are diluted with water can be used. The point at which an emulsion is achieved is easily observed. It occurs when the aqueous system changes from clear to milky.

Organic solvents of limited water miscibility, such as xylene, toluene, and butanol are useful, and they may be used along or together with water miscible solvents, such as 2-ethoxy ethanol or methyl ethyl ketone.

The aqueous coating compositions of this invention are primarily useful for coating aluminum, tin-plated steel, pretreated metals, steel, or metals coated with the same or different resin compositions, i.e., a second coat. These aqueous compositions also can be used for coating other substrates, such as wood. The most preferred and advantageous use of the coating compositions is for the interior coating of metal containers by spraying, using enough amine for salt formation with from 50% to 90% of the available carboxyl groups, and enough water to provide a final solids content of about 18% to about 25%. After application, the coating is baked for about 5 seconds to about 30 minutes at between 250° F. and about 600° F. A typical bake is for about 2 minutes at about 400° F.

The invention is illustrated in the following non-limiting examples. Proportions are by weight.

EXAMPLE 1

An acrylic polymer solution is prepared as follows:

|  | Parts by weight |
|---|---|
| Ethylene glycol monobutyl ether | 2476.0 gms |
| Methacrylic acid monomer | 2766.4 gms |
| Styrene monomer | 2766.4 gms |
| Ethyl acrylate monomer | 291.2 gms |
| Tertiary butyl peroxy isopropyl carbonate | 388.3 gms |
| TOTAL | 8688.3 gms |

All of the above components are premixed in a mixing vessel. 1464.8 gms of the premix are added to a reactor equipped with a stirrer, reflux condenser, thermometer, addition funnel and nitrogen inlet. The nitrogen flow is started and the batch is heated to 120° C. The remaining 7223.5 gms of the premix are added via the addition funnel over a three hour period. Temperature is maintained at 120° C. The batch is held for an additional two hours at 120° C. after which the batch is cooled to room temperature. The resulting acrylic polymer solution has a solids content of 71%. The acrylic polymer has a composition of methacrylic acid/styrene/ethyl acrylate in the weight ratio of 48/48/4. The polymer has an acid number of 300.

The epoxy acrylate polymer solution is prepared as follows:

|  | Parts by weight |
|---|---|
| Ethylene glycol monobutyl ether | 67.0 gms |
| n-butanol | 200.0 gms |
| Acrylic polymer solution (prepared above) | 432.0 gms |
| Dimethylaminoethanol | 60.0 gms |
| Epon 1007 epoxy resin | 480.0 gms |
| TOTAL | 1239.0 gms |

The 67 gms ethylene glycol monobutyl ether and the 200 gms of n-butanol are charged to a reaction vessel equipped with a stirrer, reflux condenser, thermometer and a nitrogen inlet. The nitrogen flow is started and the solvents are heated to slow reflux at 126° C. The acrylic polymer solution is added and dissolved. The dimethylaminoethanol catalyst is added and stirred until uniform. The Epon 1007 solid epoxy resin is added and dissolved. Epon 1007 is a solid epoxy resin manufactured by Shell Chemical Company and characterized by Y-Z, Gardner-Holdt viscosity in butyl dioxitol at 40% solids, 2000–2500 epoxide equivalent and 5 maximum Gardner Color.

The batch is held for 1.5 hours at 126° C. The batch does not gel but forms an epoxy acrylate polymer solution. The polymer composition is epoxy acrylic 61/39 by weight. The polymer has an acid number of 77, and an oxirane content less than 0.01 meq/gm. This the smallest detectable amount in the test utilized. The polymer solution has a solids content of 63%.

It is desired to stress that the dimethylaminoethanol catalyst has been employed in a much larger than normal proportion namely, 7.6% by weight, based on the total weight of materials subjected to the esterification reaction. These materials are the acrylic polymer and the epoxy resin. The reaction conditions are such as to promote reaction between the oxirane group in the Epon 1007 and the carboxyl groups in the acrylic polymer, and these two components are the material subjected to esterificaion. in contrast, a repeat of Example 1 utilizing 1.6 grams of dimethylaminoethanol (a normal proportion of esterification catalyst corresponding to 0.2% by weight, based on the materials subjected to esterification) causes the formation of a useless gel in about 25 minutes after the addition of Epon 1007 is completed. With the larger proportion of amine catalyst which avoids gelation being present, a 25 minute reaction at 126° C. is not adequate to completely consume the oxirane functionality.

A water dispersion of the non-gelled epoxy acrylate polymer solution is prepared as follows:

|  | Parts by weight |
|---|---|
| Epoxy acrylate polymer solution (prepared above) | 794.0 gms |
| Deionized water | 918.0 gms |
| TOTAL | 1712.0 gms |

The epoxy acrylate polymer solution prepared above is heated to 100° C. and placed into a disperson vessel equipped with an agitator. Agitation is started and the deionized water is added over a 15 minute period. No attempt is made to maintain the temperature of the batch at 100° C. the temperature of the batch after the water addition is 35° C. and is further cooled to room temperature. The dispersion is stable and has the following physical properties: 29.2% solids, 7.7 pH, 165 centipose viscosity (Brookfield #1 spindle, 6 RPM), 0.13 micron particle size, and 27% by volume organic volatiles.

The epoxy acrylate dispersion prepared above is modified by blending with a melamine resin (Cymel 370, American Cyanamid Co.) at the ratio of 2.5 gms melamine resin per 100 gms dispersion. Films of the above are cast on aluminum and tin plate with wirewound bars. The coated panels are baked in a forced air oven at 400° F. for 75 seconds total time. The dry films are 0.1 mil thick, are clear and high gloss and exhibit excellent properties as shown below.

|  | Substrate | |
|---|---|---|
|  | Aluminum | Tin Plate |
| Methyl ethyl ketone double rubs | 200 | 200 |
| Dry adhesion | 10 | 10 |
| Pasteurization blush | 10 | 10 |
| Pasteurization adhesion | 10 | 10 |
| Wedge bend flexibility | 4 | 5 |

(Rating: 10 = No failure; 0 = complete failure)

EXAMPLE 2

An acrylic prepolymer solution is prepared as follows:

|  | Parts by weight |
|---|---|
| Butanol | 2755.2 |
| Methacrylic Acid Monomer | 1197.7 |
| Styrene Monomer | 597.8 |
| Ethyl Acrylate Monomer | 199.5 |
| Benzoyl Peroxide (70%, water wet) | 142.8 |
| 2-Butoxyethanol | 1995.0 |

| | Parts by weight |
|---|---|
| TOTAL | 6888.0 |

The butanol is charged to a 12 liter reactor equipped with a stirrer, reflux condenser, thermometer, addition funnel and nitrogen inlet. A premix is made of the monomers and benzoyl peroxide and 20 percent is added to the reactor. The nitrogen flow is started and the reactor is heated to 93° C. and held at this temperature for 15 minutes. The remaining premix is added uniformly over 3 hours while maintaining 93±3° C. After the premix is added temperature is held for 2 hours to complete the polymerization. The 2-butoxyethanol is then added to dilute the prepolymer. The resulting solution has a solids content of 30 percent, an acid number of 383 and a viscosity of 2600 centipoise.

An epoxy acrylate polymer solution containing phenolic terminated diluent is prepared as follows:

| | Parts by weight |
|---|---|
| Epon 829[1] | 1592.0 |
| Bisphenol A | 1156.4 |
| Methyl i-Butyl Ketone | 144.2 |
| 2-Butoxyethanol | 554.0 |
| 2-Hexoxyethanol | 78.0 |
| Butanol | 153.1 |
| Acrylic Prepolymer Solution | 3205.5 |
| Epon 1009[2] | 2749.3 |
| Dimethylaminoethanol | 144.2 |
| Dimethylaminoethanol | 97.8 |
| TOTAL | 9874.5 |

[1]Epon 829 (Shell) Epoxy Equivalent weight 185-192 diglycidyl ether of bisphenol A
[2]Epon 1009 (Shell) Epoxy Equivalent weight 2580-4000 diglycidyl ether of bisphenol A The Epon resin, bisphenol A and methyl i-butyl ketone are charged to a 12 liter reactor with a stirrer, reflux condenser, thermometer and nitrogen inlet. Nitrogen flow is started and the reactants are heated to 135° C. The best input is stopped and the reaction proceeds to raise the temperature to about 170° C. after which the temperature is controlled at 160°-170° C. This temperature is held until the reaction mass has an oxirane content less than 0.004 eg/100 g solid. The 2-butoxyethanol, 2-hexoxyethanol, butanol and acrylic prepolymer are then added and the temperature is raised to 115° C. The Epon 1009 is added and held at temperature until dissolved. The first portion of dimethylaminoethanol (sufficient to neutralize 25 percent of acrylic acidity) is added and the reaction is held at 115° C. for 1 hour to complete the esterification. The reaction turns from opaque to clear in this period and the acid number decreases by an amount equivalent to the oxirane present in the Epon 1009. The remainder of the dimethylaminoethanol is added to aid subsequent dispersion. The epoxy acrylate solution contained no detectable oxirane functionality. It had a volatile content of 67 percent, acid number of 45 and bubble tube viscosity of T-W when diluted with two parts of tetrahydrofuran.

The above epoxy acrylate polymer solution was dispersed as follows:

| | Parts by weight |
|---|---|
| Epoxy Acrylate Solution | 3423.0 |
| Dimethylaminoethanol | 7.0 |
| Cymel 1156 | 120.0 |
| Dionized Water | 5756.0 |
| 2-Butoxyethanol | 73.0 |
| 2-Hexoxyethanol | 112.0 |
| Butanol | 93.0 |
| TOTAL | 9584.0 |

The epoxy acrylate polymer solution is charged to a dispesion vessel equipped with high speed agitator and reflux condenser. The temperature is adjusted to about 105° C. The dimethylaminoethanol is added followed by the Cymel 1156 (a but oxynethylated melamine curing agent, American Cyanamid Company). After uniformity of mixing has been achieved the deionized water is added over approximatey 1 hour under efficient agitation while allowing the temperature to decrease. The remaining solvents are added and stirring is maintained for 20 minutes. A stable dispersion is formed having the following physical properties: 24% solids, 8.4 pH and viscosity of 40 seconds in a #2 Zahn cup. Films of the above are cast on aluminum and tin plate with wire wound bars and baked in a forced air oven at 400° F. for 2 minutes total time. The dry films are 0.1-0.2 mil thick, are clear and glossy and exhibit excellent properties as shown below.

| | Aluminum | Tin Plate |
|---|---|---|
| Methyl Ethyl Ketone Double Rubs | 40 | 40 |
| Dry Adhesion | 10 | 10 |
| Pasteurization 45 min @ 170° F. | | |
| Blush | 10 | 10 |
| Adhesion | 10 | 10 |
| Wedge Bend Flexibility | 9+ | 5 |

(Rating: 10 = No failure; 0 = Complete failure)

EXAMPLE 3

An acrylic polymer solution is prepared as follows:

| | Parts by Weight |
|---|---|
| Butanol | 4228.4 |
| Methacrylic Acid Monomer | 1584.0 |
| Styrene Monomer | 1760.0 |
| Ethyl Acrylate Monomer | 176.0 |
| Benzoyl Peroxide (70%, water wet) | 256.0 |
| Tertiary butylperoxy isopropyl carbonate | 15.8 |
| Tertiary butylperoxy isopropyl carbonate | 15.8 |
| Tertiary butylperoxy isopropyl carbonate | 15.8 |
| TOTAL | 8051.8 |

The butanol is charged to a 12 liter reactor equipped with a stirrer, reflux condenser, thermometer, addition funnel and nitrogen inlet. The nitrogen flow is started and the solvent is heated to 118° C. A premix of the methacrylic acid, styrene, ethyl acrylate and benzoyl peroxide is added to the reaction via the addition funnel over a five hour period while reflux is maintained at 113°-118° C. The batch is held an additional hour at 113° C. after which 15.8 g of t-butylperoxy isopropyl carbonate (TBIC) is added. This temperature is held for 1.5 hours. The procedure of adding TBIC and holding at temperature is repeated twice to assure high conversion of residual monomers. The resulting acrylic polymer solution has a solids content of 44%, an acid number of 285 and a bubble tube viscosity of U when diluted to 35% solids with 2-butoxyethanol.

The epoxy acrylate polymer solution is prepared as follows:

|  | Parts by weight |
| --- | --- |
| 2-Butoxyethanol | 137.1 |
| DER 331[3] | 854.8 |
| Bisphenol A | 480.6 |
| Tri-n-butylamine | 2.7 |
| 2-Butoxyethanol | 306.0 |
| Butanol | 18.0 |
| Acrylic polymer solution | 1005.9 |
| Deionized water | 167.7 |
| Dimethylaminoethanol | 30.0 |
| TOTAL | 3002.8 |

[3]DER 331 (DOW) Liquid epoxy having an epoxy equivalent weight 185–192 diglycidyl ether of bisphenol A The 2-butoxyethanol, DER 331, bisphenol A and tri-n-butylamine are charged to a reaction vessel equipped with a stirrer, reflux condenser, thermometer and nitrogen inlet. The nitrogen flow is started and the charge is heated to 145° C. Heat input is stopped and the reaction proceeds to raise the temperature to 170°–175° C. at which point the temperature is controlled and brought back to 150° C. This temperature is held until the oxirane content is 0.3 meq/g. The 2-butoxy-ethanol is then added followed by the butanol and the acrylic polymer solution. The water is then added and the temperature is adjusted to 94° C. The dimethylaminoethanol esterification catalyst (sufficient to neutralize 15 percent of acrylic acidity) is added and the reaction is held for three hours at 94° C. During the reaction period the appearance of the reaction mixture turns from white and opaque to clear indicating compatibilization of the resin phases and the acid content of the reaction mixture falls by an amount equal to the oxirane content of the epoxy component. The product has a solids content of 60%, an acid number of 59 and a bubble tube viscosity of Z at 33.5% NV in N-methyl pyrrolidone.

A water dispersion of the nongelled epoxy acrylate solution is prepared as follows:

|  | Parts by weight |
| --- | --- |
| Epoxy Acrylate Polymer Solution | 373.4 |
| 2-butoxyethanol | 17.6 |
| 2-hexoxyethanol | 4.6 |
| Dimethylaminoethanol | 15.5 |
| Cymel 1156 | 11.1 |
| Deionized water | 577.8 |
| TOTAL | 1000.0 |

The epoxy acrylate polymer solution at 80°–90° C. is charged to a dispersion vessel equipped with high speed agitator. Under low speed agitation the solvents, neutralizer and curing agent are uniformly incorporated. The rate of agitation is then increased and the water is added as rapidly as it is incorporated into the mixture. A stable dispersion is formed having the following physical properties: 22.4% solids, 8.3 pH, and 240 cps. Films of the above are cast on aluminum and tin plate with wire wound bars and baked in a forced air oven at 200° F. for 75 sec total time. The dry films are 0.1 mil thick, are clear and glossy and exhibit excellent properties as shown below:

|  | Aluminum | Tin Plate |
| --- | --- | --- |
| Methyl Ethyl Ketone double rubs | 18 | 40 |
| Dry Adhesion | 10 | 10 |
| Pasteurization blush | 10 | 10 |
| Pasteurization adhesion | 10 | 10 |
| Wedge bend flexibility | 5 | 8 |

(Rating 10 = no failure, 0 = complete failure)

EXAMPLE 4

An epoxy acrylate solution is prepared as follows:

|  | Parts by Weight |
| --- | --- |
| 2-Butoxyethanol | 36.6 |
| DER 333[4] | 240.1 |
| Bisphenol A | 125.9 |
| 2-Butoxyethanol | 77.3 |
| Acrylic prepolymer of Example 3 | 270.0 |
| Deionized Water | 22.5 |
| Dimethylaminoethanol | 31.7 |
| TOTAL | 804.1 |

[4]DER 333 (Dow Chemical Company) A precatalyzed liquid epoxy resin having an epoxy equivalent weight 193–203.

The 2-butoxyethanol, DER-333 and bisphenol A are charged to a 1 liter reactor with a stirrer, reflux, condenser, thermometer and nitrogen inlet. Nitrogen flow is started and the reactants are heated to 150° C. The temperature is held at 150° C. until the measured oxirane content falls to 0.30 meq/g. The second portion of 2-butoxyethanol is then added followed by the acrylic prepolymer and water. The reactants are stirred until uniform and the temperature adjusted to 95° C. The reaction mixture at this point is opaque. The dimethylaminoethanol is added with no apparent change in appearance, however, the reaction clarifies within 10 minutes indicating a compatiblizing reaction has taken place. The reaction is held for an additional 90 minutes for completion after which the product acid number falls to that expected for a high degree of epoxy/acrylic esterification.

The product has a solids content of 59.3%, and acid number of 61.7 and a bubble tube viscosity of X-Y at 33.5% NV in N-methyl pyrrolidone. It is formulated to a dispersion by the method of Example 3 but without the use of added neutralizer. It produces useful films when cured onto aluminum and tin plate.

EXAMPLE 5

Acrylic prepolymer A is prepared as follows:

|  | Parts by Weight |
| --- | --- |
| Butanol | 2290.0 |
| 2-Butoxyethanol | 2290.0 |
| Methacrylic Acid Monomer | 1225.0 |
| Styrene Monomer | 2100.0 |
| Ethyl Acrylate Monomer | 175.0 |
| Benzoyl Peroxide (70%, water wet) | 250.0 |
| Benzoyl Peroxide | 5.0 |
| TOTAL | 8335.0 |

The butanol and 2-butoxyethanol are charged to a 12 liter reactor. The monomers and first benzoyl peroxide are premixed. Seven hundred thirty five grams of premix are added to the reactor and heated with stirring to 93° under an inert gas blanket. This temperature is held for 15 minutes after which the remaining premix is added over a 3 hour period at 93°±3° C. The reaction is held at this temperature for an additional 2 hours. The last portion of the benzoyl peroxide is then added and temperature is held an additional 1.5 hours. The product has a solids content of 42.5% and an acid number of 219.6.

Acrylic prepolymer B is prepared as follows:

|  | Parts by Weight |
|---|---|
| Butanol | 1057.0 |
| 2-Butoxyethanol | 1057.0 |
| Acrylic Acid | 913.0 |
| Methyl Methacrylate | 566.1 |
| 2-Ethylhexyl Acrylate | 45.9 |
| Benzoyl Peroxide (70%, water wet) | 109.3 |
| TOTAL | 3753.2 |

This acrylic preparation is analogous to the preparation of acrylic prepolymer A except that a 5 liter reactor is used and the initial charge of premix to the reactor is 306 grams. No additional increment of initiator is used to complete this polymerization. The product has a solids content of 42 percent and an acid number of 450.

An epoxy acrylate prepolymer solution is prepared as follows:

|  | Parts by Weight |
|---|---|
| Acrylic Prepolymer A | 1323.5 |
| Acrylic Prepolymer B | 147.1 |
| Epon 1007 | 600.0 |
| Dimethylaminoethanol | 71.4 |
| Dimethylaminoethanol | 42.8 |
| TOTAL | 2184.8 |

Acrylic prepolymers A and B are charged to a 3 liter reaction vessel and heated to the boiling point. Two hundred fifty grams of distillate containing residual monomers is stripped out. The Epon 1007 epoxy resin is then added and dissolved. The reaction temperature is adjusted to 115° C. and the first portion of amine is added over a five minute period. The initial reaction appearance is cloudy but at the end of 1.5 hours it clears very perceptibly. During this time the acid number decreases by the amount calculated for epoxy/acid esterification. The second portion of amine is added to increase the degree of neutralization. The epoxy acrylate product solution has a solids content of 63.4 and an acid number of 111.2 and is easily emulsified as in previous examples to give stable dispersions which are formulated to give useful coating properties.

EXAMPLE 6

An acrylic prepolymer solution is prepared as follows:

|  | Parts by Weight |
|---|---|
| 1-methoxy-2-propanol | 615.0 |
| Methacrylic Acid Monomer | 600.0 |
| Styrene Monomer | 450.0 |
| Ethyl Acrylate Monomer | 450.0 |
| Tertiary Butylperoxy Isopropyl Carbonate* | 80.0 |
| TOTAL | 2195.0 |

*75% active in mineral spirits

The 1-methoxy-2-propanol is charged to a 3 liter reactor equipped with a stirrer, reflux condenser, thermometer, addition funnel and nitrogen inlet. The nitrogen flow is started and the solvent is heated to 120° C. A premix of the methacrylic acid, styrene, ethyl acrylate and initiator is added to the reaction via the addition funnel over a four hour period while the temperature is maintained at 117°–120° C. The batch is held an additional two hours at this temperature. The resulting acrylic polymer solution has a solids content of 70% and an acid number of 254.

An epoxy acrylate polymer solution is prepared as follows:

|  | Parts by Weight |
|---|---|
| Araldite 6099 | 350.0 |
| 2-Butoxyethanol | 84.0 |
| Butanol | 83.0 |
| Acrylic prepolymer | 110.0 |
| Dimethylaminoethanol | 14.4 |
| 2-Butoxyethanol | 25.0 |
| Butanol | 25.00 |
| TOTAL | 691.4 |

The Araldite 6099, 2-butoxyethanol and butanol are charged to a reaction vessel equipped with heating mantle, stirrer, reflux condenser, thermometer and nitrogen inlet. Araldite 6099 is a solid epoxy resin made by Ciba-Geigy and is characterized by an epoxy equivalent weight of 2500–4000. Nitrogen flow is started and the charge is heated to 122° C. The acrylic prepolymer is added and the mixture is stirred until uniform. A temperature of 122° C. is regained and the dimethylaminoethanol catalyst is added as a solution in 1/1 2-butoxyethanol/butanol. This temperature is held for 3 hours to complete the esterification. The resulting epoxy acrylate polymer has a nonvolatile content of 61.7 percent and an acid number of 31.

A water dispersion of the above epoxy acrylate solution is prepared as follows:

|  | Parts by Weight |
|---|---|
| Partially neutralized epoxy acrylate polymer solution (prepared above) | 460.0 |
| Demineralized Water | 660.0 |
| TOTAL | 1120.0 |

The epoxy acrylate solution is placed into a dispersion vessel equipped with a stirrer and is heated to 80° C. Agitation is started and the water is added slowly. Agitation is continued until all the polymer is dispersed. The dispersion is cooled to room temperature. It has a solid content of 25.4 percent and is characterized by 7.60 pH, 0.10 micron particle size and 420 centipoise viscosity (Brookfield #1 spindle, 12 rpm). With the addition of hexamethoxymethylol melamine the dispersion is formulated to give finishes suitable for application to aluminum and tin plate.

EXAMPLE 7

An acrylic prepolymer is prepared as follows:

|  | Parts by Weight |
|---|---|
| Butanol | 2748.8 |
| 2-Butoxyethanol | 1480.1 |
| Methacrylic Acid Monomer | 1582.0 |
| Styrene Monomer | 1760.0 |
| Ethyl Acrylate Monomer | 176.0 |
| Benzoyl Peroxide (70%, water wet) | 251.2 |

-continued

|  | Parts by Weight |
| --- | --- |
| TOTAL | 8000.1 |

The butanol and 2-butoxyethanol are charged to a 12 liter reactor equipped with stirrer, reflux condenser, thermometer, addition funnel and nitrogen inlet. A premix is made of the monomers and benzoyl peroxide and 20 percent is added to the reactor. The nitrogen flow is started and the reactor is heated to 93° C. and held at this temperature for 15 minutes. The remaining premix is added uniformly over 3 hours while maintaining 93°±3° C. After the premix is added, this temperature is held for 2 hours to complete the polymerization. The resulting prepolymer has a solids content of 43.9 percent and an acid number of 293.

An epoxy acrylate polymer solution is prepared as follows:

|  | Parts by Weight |
| --- | --- |
| Acrylic Polymer Solution | 894.5 |
| Butanol | 204.8 |
| 2-Butoxyethanol | 110.3 |
| Epon 1009 | 400.1 |
| Dimethylaminoethanol | 54.3 |
| Epon 1007 | 800.2 |
| Dimethylaminoethanol | 36.0 |
| TOTAL | 2500.2 |

The acrylic prepolymer solution, prepared above, butanol and 2-butoxyethanol are charged to a 3 liter reaction vessel equipped with stirrer, reflux condenser, thermometer and nitrogen inlet. The nitrogen flow is started and the charge is heated to 118° C. The Epon 1009 is added and stirred until completely dissolved. The reaction temperature is adjusted to 115° C. and the first portion of amine is added within 5 minutes. The Epon 1007 is then added over 30 minutes with sufficient heat input to maintain the temperature in the range 110°-117° C. A temperature of 117° C. is held for 1 hour in which time the reaction mixture becomes clear, oxirane content decreases to 0 and the acid number approaches that calculated for complete epoxy esterification. The remainder of the dimethylaminoethanol is then added to aid subsequent dispersion. The epoxy acrylate solution has a non volatile content of 65.1, an acid number of 54.1 and a bubble tube viscosity of $Z_1^+$, at 33.5 percent NV in N-methyl pyrrolidone.

A water dispersion of the nongelled epoxy acrylate solution is prepared as follows:

|  | Parts by Weight |
| --- | --- |
| Epoxy Acrylate Solution | 300.0 |
| Deionized Water | 370.0 |
| TOTAL | 670.0 |

The epoxy acrylate polymer solution at about 80° C. is charged to a dispersion vessel equipped with high speed agitator. The water is added slowly until the dispersion thins then more rapidly as the dispersion is diluted. A stable dispersion is formed having the following physical properties: 28.6% solids, 7.91 pH and 135 centipoise viscosity. Films of the above are cast on aluminum and tin plate with wire wound bars and baked in a forced air oven at 400° F. for 2 minutes total time. The dry films are 0.15 to 0.2 mil thick and exhibit excellent properties as shown below:

|  | Aluminum | Tin Plate |
| --- | --- | --- |
| Methyl ethyl ketone double rubs | 20 | 85 |
| Dry Adhesion | 10 | 10 |
| Pasteurization blush | 10 | 10 |
| Pasteurization Adhesion | 10 | 10 |
| Wedge bend flexibility | 8 | 8 |

(Rating — 10 = no failure, 0 = complete failure)

The incorporation of 5 percent Cymel 370 (American Cyanamid Co.) cross-linker increases solvent resistance but does not detract from film performance.

We claim:

1. A method of esterifying a solvent-soluble carboxyl-functional polymer with an epoxy resin without gelation which comprises conducting the esterification reaction in organic solvent medium in the presence of greater than about 1.5% based on the weight of the reactants subjected to esterification, of an amine esterification catalyst and at an elevated temperature sufficient to cause the oxirane groups of said epoxy resin to react with said carboxyl groups until said oxirane groups are substantially entirely consumed; in which said epoxy resin comprises aromatic polyethers containing oxirane groups, at least 5% of said aromatic polyethers being diepoxide, said epoxy resin constituting at least about 40% of the total resin solids content and containing sufficient oxirane groups to provide a ratio of oxirane groups to carboxyl groups of from 1:2 to 1:20 to produce an epoxy resin-carboxyl polymer ester, the improvement comprising:

dispersing said epoxy resin-carboxyl polymer ester in an organic medium of organic solvent.

* * * * *